United States Patent [19]

Inaba et al.

[11] Patent Number: 4,895,505
[45] Date of Patent: Jan. 23, 1990

[54] ELECTRICALLY OPERATED INJECTION MOLDING MACHINE

[75] Inventors: Yoshiharu Inaba, Kawasaki; Masatoyo Sogabe, Hachioji, both of Japan

[73] Assignee: Fanuc Ltd, Oshino, Japan

[21] Appl. No.: 184,488

[22] PCT Filed: Sep. 1, 1987

[86] PCT No.: PCT/JP87/00650
§ 371 Date: Apr. 13, 1988
§ 102(e) Date: Apr. 13, 1988

[87] PCT Pub. No.: WO88/01562
PCT Pub. Date: Mar. 10, 1988

[30] Foreign Application Priority Data
Sep. 2, 1986 [JP] Japan .................................. 61-205041

[51] Int. Cl.⁴ .................. B29C 45/77; B29C 45/80
[52] U.S. Cl. .................................. 425/145; 264/40.5; 425/150
[58] Field of Search .................. 310/12, 13, 15, 17; 425/145, 150; 264/40.5

[56] References Cited
U.S. PATENT DOCUMENTS

| | | | |
|---|---|---|---|
| 3,247,406 | 4/1966 | Toesca | 310/17 |
| 3,643,117 | 2/1972 | Alger et al. | 310/17 |
| 3,670,188 | 6/1972 | Voros, Jr. | 310/17 |
| 3,949,249 | 4/1976 | Wiseley et al. | 310/17 |
| 4,500,827 | 2/1985 | Merritt et al. | 310/15 |
| 4,735,564 | 4/1988 | Sasaki et al. | 425/145 |
| 4,793,263 | 12/1988 | Basic et al. | 310/13 |

*Primary Examiner*—Jay H. Woo
*Assistant Examiner*—Timothy W. Heitbrink
*Attorney, Agent, or Firm*—Staas & Halsey

[57] ABSTRACT

An injection molding machine using a linear motion type electric motor (10, 20), as a drive source, is provided, which is simple and compact in construction. The linear motion type electric motor includes a nonmagnetic shaft (21) on which yokes (22) and permanent magnets (23) are alternately fitted, and an annular stator (10) having an outer tube (11) within which cores (12) and printed type coils (13–18) are alternately disposed, the shaft extending through the stator. Upon supply of three-phase alternating currect to the coils, a screw of the injection molding machine coupled to the shaft is moved in unison with the shaft to thereby perform injection operation.

20 Claims, 6 Drawing Sheets

ELECTRICALLY OPERATED INJECTION MOLDING MACHINE

BACKGROUND OF THE INVENTION

1. Field of the Invention

The present invention relates to an injection molding machine having a drive source which is of a linear motion type electric motor.

2. Description of the Related Art

An injection molding machine includes various mechanisms such as an injection mechanism for axially moving a screw to perform injection operation, a clamping mechanism for opening, closing and clamping molds, an ejector mechanism for axially moving an ejector pin to extrude a molded product, and a nozzle touch mechanism for touching a nozzle to the mold. Each of these mechanisms has its axis (hereinafter referred to as linear motion member) arranged to be linearly driven. A screw is an example of such a linear motion member.

In a hydraulically operated injection molding machine, it is easy to cause linear motion of these linear motion members, by driving the members with a hydraulic cylinder. On the other hand, in a conventional electrically operated injection molding machine, a rotational output of an electric motor is converted into a driving force (hereinafter referred to as linear driving force) which acts on the associated linear motion member in the direction along which the same member moves. This is done with a conversion mechanism, such as a ball screw and nut, so that the linear motion member is moved by the linear driving force.

In this manner, a conventional injection molding machine requires a conversion mechanism, and is hence complicated in construction and high in cost. Moreover, it requires space for installation of the conversion mechanism, and has the drawback that the whole arrangement becomes large in size.

SUMMARY OF THE INVENTION

An object of the present invention is to provide an injection molding machine which is simple and compact in construction and is low-priced.

In order to achieve the above-mentioned object, an injection molding machine according to the present invention includes a linear motion member arranged to be linearly movable relative to a main body of the injection molding machine, and a linear motion type electric motor supported by the main body of the molding machine. Further, the linear motion member is coupled to a movable portion of the motor in a manner so as to be movable in unison with the movable portion which is arranged to be linearly movable relative to a stationary portion of the motor.

As mentioned above, according to the present invention, since the linear motion type electric motor is employed as the drive source of the linear motion member, no conversion mechanism for converting rotational driving force into linear driving force is required. As a result, an injection molding machine can be provided, which is simple and compact in construction and low in cost.

DETAILED DESCRIPTION OF THE PREFERRED EMBODIMENTS

Figure 1:
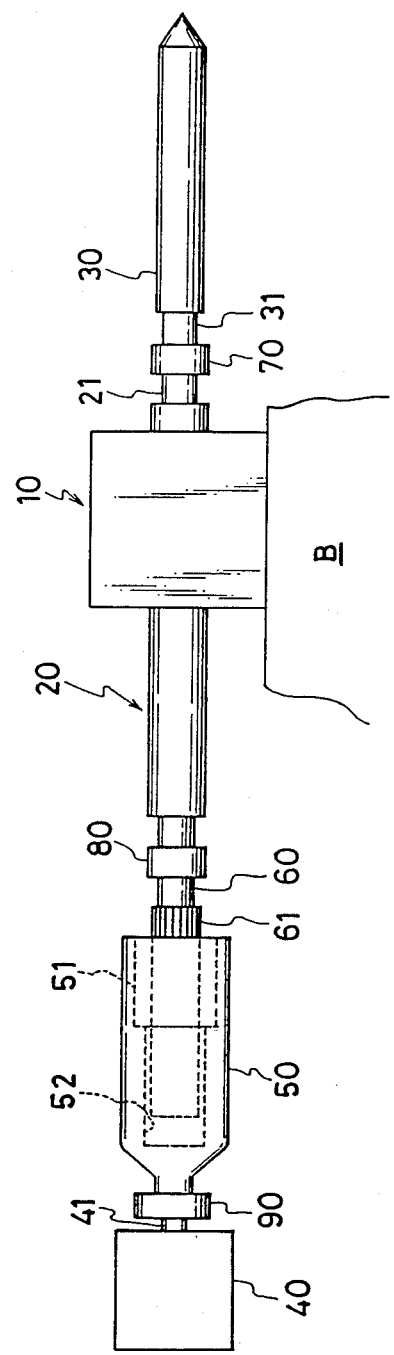
FIG. 1 is a schematic view showing an essential portion of an injection molding machine according to an embodiment of the present invention.

FIG. 1 shows an injection molding machine according to an embodiment of the present invention, which employs a linear motion type electric motor (hereinafter referred to as linear motor) as a drive source of an injection mechanism. Reference numeral 10 designates an annular stator which forms one half of the linear motor and is fixed to a base B of the injection molding machine. Reference numeral 20 denotes a movable section or armature forming the other half of the linear motor, which extends through a central hollow portion of the stator 10. The movable section 20 has a shaft 21 having one end fixed to a screw shaft 31 of a screw 30 by means of fixture means 70, and another end fixed to a spline shaft 60 by means of fixture means 80. A tubular member 51 is spline-connected to a spline groove 61 formed in the spline shaft 60 which is arranged to be rotatable in unison with the tubular member 51 and axially movable relative to the later member.

A rotary drive member 50 is formed with a central stepped hole 52 having a large diameter portion to which the tubular member 51 is fitted so that the member 51 is rotatable in unison with the member 50. The hole 52 has a small diameter portion through which the spline shaft 60 is loosely inserted. Further, the rotary drive member 50 is coupled through a fixture means 90 to a motor shaft 41 of a screw rotation motor 40 for rotating the screw 30.

Figure 2:
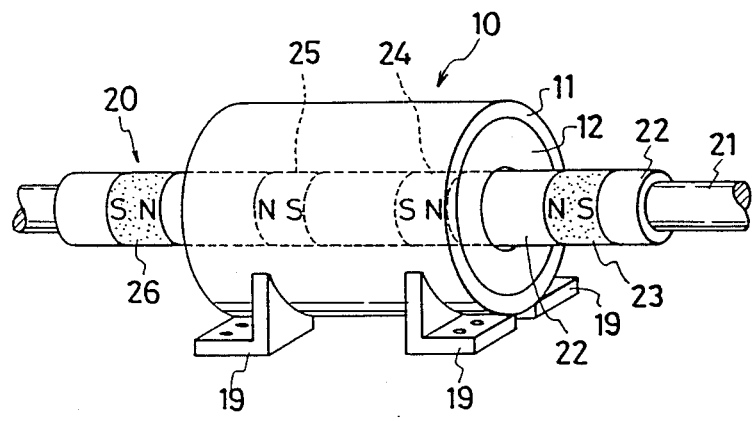
FIG. 2 is a fragmentary perspective view showing a linear motion type electric motor of the FIG. 1 embodiment.
Figure 3:
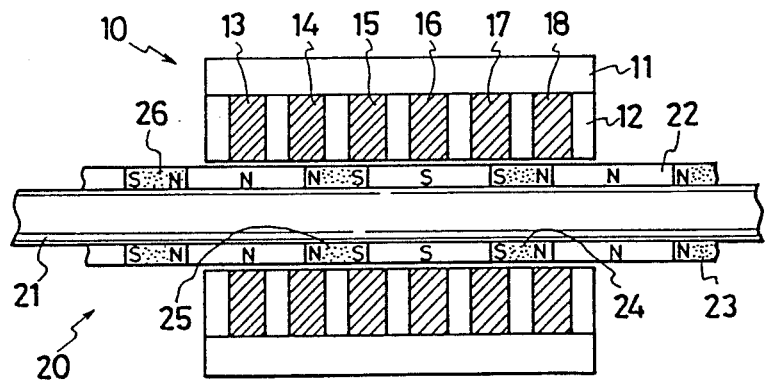
FIG. 3 is a fragmentary schematic longitudinal section view showing the motor of FIG. 2.

With reference to FIGS. 2 and 3, a further explanation of the linear motor will be given.

The stator 10 of the linear motor includes an outer tube 11, a plurality of annular cores 12 and a plurality of printed type annular coils 13 through 18. The outer tube is made of a soft magnetic material (mild steel, for instance), and the printed coils 13 through 18 each have a predetermined inner diameter and are fittedly mounted in the outer tube 11. The cores 12 are made of a soft magnetic material (mild steel, for instance), and preferably each have the same inner diameter as that of the printed coils 13 through 18 and are fitted in the outer tube 11. Further, the cores 12 have outer peripheral surfaces which are formed with grooves (not shown) extending in the axial direction of the cores, so that lead wires (not shown) are disposed in the grooves for connecting associated ones of the printed coils 13 through 18 to each other and connecting a three-phase A.C. power supply (not shown) with associated coils.

The outer tube 11, the cores 12 and the printed coils 13 through 18 are separately fabricated beforehand. During assembly, the cores 12, which number seven in the illustrated embodiment, and the printed coils 13 through 18 are disposed alternately within the interior of the outer tube 11. Two lead wires of each printed coil 13 through 18 are drawn out to the outside through the grooves of the cores 12. Finally, the cores 12 disposed at opposite sides are connected to the outer tube 11 by means of a shrinkage fit, for instance. In the meantime, a mount member 19 is fixed to the stator 10 for connecting the stator 10 to the base B of the injection molding machine.

The movable section 20 includes the shaft 21, a plurality of annular yokes (part of which is shown by reference numeral 22), and a plurality of annular permanent magnets (part of which is shown by reference numerals 23, 24, 25 and 26). The shaft 21 is composed of a non-magnetic material, and the yokes 22 each have an outer diameter which is slightly smaller than the inner diameter of the stator 10, and are fitted on the shaft 21. Preferably, the permanent magnets 23, 24, 25, 26, each have the same outer diameter as that of the yokes 22, and are fitted on the shaft 21. Respective lengths of the yokes 22 and the permanent magnets 23, 24, 25, 26, are set beforehand to values sufficient to permit the magnets and the coil unit to achieve a desired electromagnetic function (described later).

The shaft 21, the yokes 22 and the permanent magnets 23, 24, 25, 26, are separately fabricated beforehand. When assembled, the yokes 22 and the permanent magnets 23, 24, 25, 26, are alternately disposed on the outer periphery of the shaft 21 over a length which is larger than a desired moving stroke of the movable section 20 in such a manner that the adjacent permanent magnets are disposed oppositely in their polarity. In this case, the adjacent yokes 22 are magnetized in a manner having the N pole and the S pole, respectively.

The printed coil pairs 13, 16; 14, 17; 15, 18 are connected to U-, W- and V-phases of the three-phase alternating current (see, FIG. 4), respectively. In addition, as shown in FIGS. 5-7, the respective lead wires are connected to the three-phase A.C. power supply so that electric current flows in opposite directions between the two coils forming as associated one of the printed coil pair.

Referring to FIG. 4 through FIG. 7, a further explanation will be given as to the case where the linear motor is driven to perform injection operation.

Figure 4:
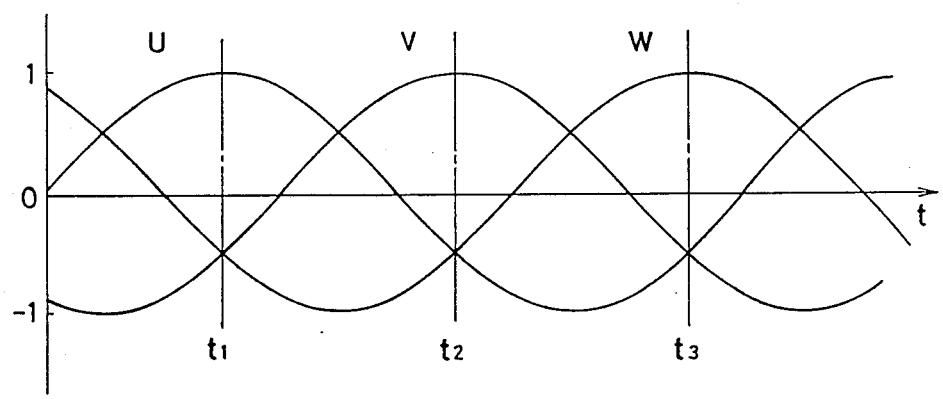
FIG. 4 is a diagram showing a waveform of a three-phase alternating current supplied to the motor.
Figure 5A:
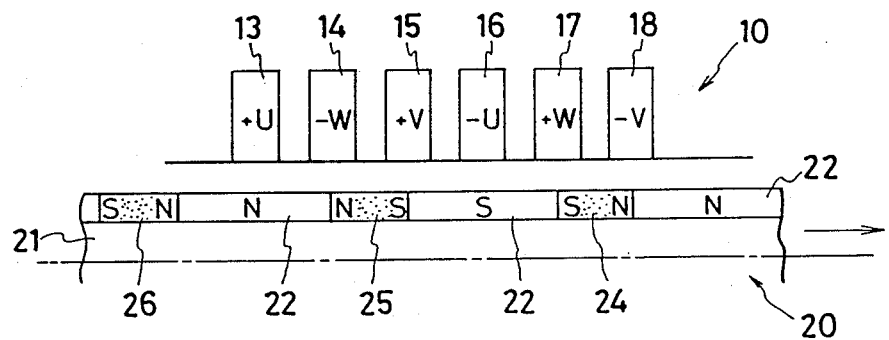
FIG. 5A is a view explaining a positional relationship between a stator of the linear motor and a movable section of the motor.
Figure 5B:
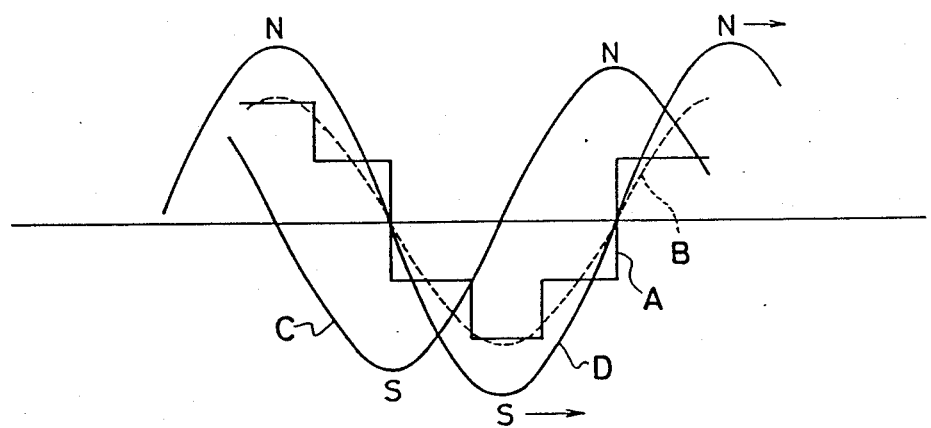
FIG. 5B is a diagram showing waveforms of an electric current flowing through the stator, magnetic field generated by the current, and magnetic field generated by the movable section, when the positional relationship of FIG. 5A is assumed.

First, it is assumed that the stator 10 and the armature 20 assume their positional relationship shown in FIG. 5A and the three-phase alternating current shown in FIG. 4 is supplied to the respective printed coils 13 through 18. At the time point of t1, U=1, W=−(½) and V=−(½), that is, electric current of 100% flows in the printed coil (+U) 13, and electric current of 50% flows in the printed coil (−W) 14, and electric current of −50% flows in the printed coil (+V) 15, respectively. Similarly, electric current of −100%, −50% and 50% flows through coils (−U), (+W) and (−V), respectively. That is, electric current flowing through the printed coils 13 through 18 has a stair step waveform A, as shown in FIG. 5B, and a totally averaged waveform corresponding to the waveform A is indicated by B which is shown by dotted line. Further, magnetic field generated by this electric current waveform B is indicated by a waveform C which is shifted in phase from the electric current distribution.

Figure 6A:
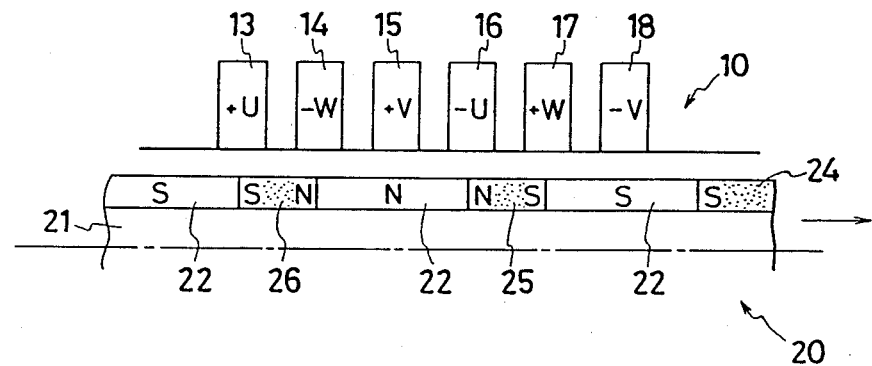
FIG. 6A is a view showing a different positional relationship between the stator and the movable section.

On the other hand, magnetic field generated by the permanent magnets 24 through 26 is shown by a waveform D. Accordingly, as apparent from a relative phase relationship of waveforms C and D shown in FIG. 5B, the S pole of waveform D is repulsive from the S pole of waveform C but is attractive to the N pole of waveform C, and the N pole of waveform D is repulsive from the N pole of waveform C. As a result, the movable section 20 which is movable relative to the stator 10 is moved right, as shown by an arrow. In this manner, the positional relationship shown in FIG. 6A is reached.

Figure 6B:
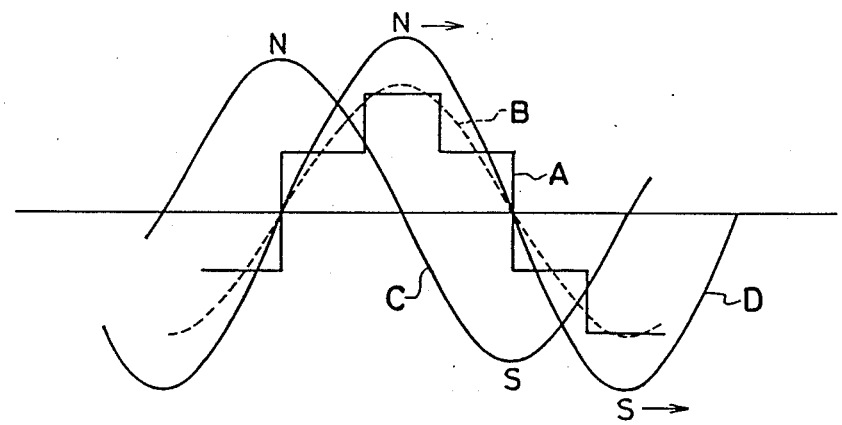
FIG. 6B is a diagram showing a waveform associated with the positonal relationship of FIG. 6A.
Figure 7A:
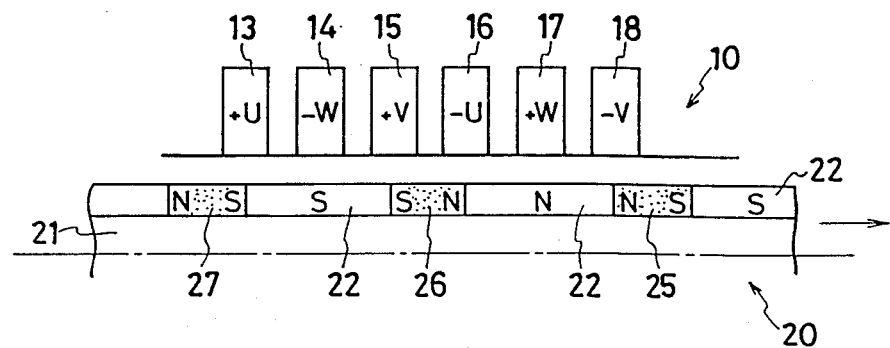
FIG. 7A is a view explaining a further different positional relationship.

At the time point of t2, electric current flowing through the printed coils 13 through 18, average electric current, magnetic field generated by the average current, and magnetic field generated by the permanent magnets 24 through 26 are indicated in FIG. 6B by waveforms A, B, C, and D, respectively. As apparent from the relative positional relationship between the waveforms C and D, the armature 20 is moved right, as shown by an arrow. In this manner, the positional relationship shown in FIG. 7A is reached.

Figure 7B:
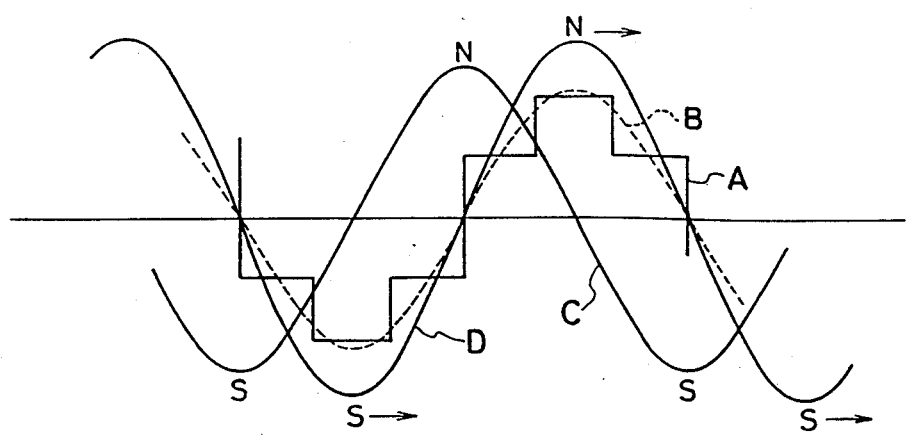
FIG. 7B is a diagram showing a waveform associated with the positional relationship of FIG. 7A.

Next, at the time point of t3, electric current flowing through the printed coils 13 through 18, average electric current, magnetic field generated by the average current, and magnetic field generated by the permanent magnets 25 through 27 are indicated in FIG. 7B by waveforms A, B, C, and D, respectively. As apparent from the relative positional relationship between the waveforms C and D, the armature 20 is moved right, as shown by an arrow.

As apparent from the foregoing explanation, the movable section 20 and hence the shaft 21 are linearly moved by supplying a three-phase alternating current to the respective printed coils 13 through 18, so as to move the screw 30 in the forward direction (to the right in FIG. 1), thereby performing an injection operation.

During a metering operation, the screw rotating motor 40 is driven to rotate the shaft 21 of the movable section 20 which is coupled through rotary drive member 50, outer tube 51 and spline shaft 60 to the motor 40 in a manner to be rotatable in unison therewith, so as to rotate the screw 30. At this time, weak electric current may be supplied to the printed coils 13 through 18 of the stator 10 of the linear motor, to apply a predetermined back pressure to molten resin.

In the above-mentioned embodiment, the case using the linear motor of synchronous type has been explained. Alternatively, an induction type linear motor may be employed. In this case, a shaft made of a soft magnetic material and an electrically conductive member are employed in place of the non-magnetic shaft 21 and the permanent magnets 23, 24, 25, 26, in the arrangement shown in FIGS. 2 and 3. In the case of using an induction motor, it is unnecessary to dispose annular electrically conductive members and annular yokes in phase with the printed coils 13 through 18.

A linear motor is employed as the drive source for injection axis for axially driving the screw, in the above-mentioned embodiment. Similarly, linear motors may be used as drive sources for linear motion mechanisms such as clamping mechanism, ejector and nozzle touch mechanism, to eliminate conversion mechanisms for converting rotary motion into linear motion to simplify the whole arrangement, as explained above. In particular, it is advantageous to construct the drive source for axially driving the screw by the above-mentioned type of cylindrical linear motor because this makes it possible to achieve the axial and rotary motions of the screw with a simple structure.

We claim:

1. An injection molding machine having an injection mechanism, a mold clamping mechanism, an ejector, and a nozzle touch mechanism, each including a linear motion member which is linearly movable, comprising:
   at least one linear motion electric motor having a stationary section and a movable section which is linearly movable relative to said stationary section; and
   means for operatively coupling each said movable section of said at least one linear motion electric motor to a corresponding one of said linear motion members of the injection mechanism, the mold clamping mechanism, the ejector, and the nozzle touch mechanism, so as to be movable in unison with said corresponding linear motion member.

2. An injection molding machine according to claim 1, wherein said linear motion electric motor is a synchronous electric motor having a field system and an armature, one of the movable and stationary sections of said linear motion electric motor being formed by said field system, and the other section being formed by said armature.

3. An injection molding machine according to claim 2, further comprising a base, the linear motion member being linearly movable relative to the base.

4. An injection molding machine according to claim 2, wherein the linear motion member is a screw.

5. An injection molding machine according to claim 2, wherein said linear motion electric motor is an induction electric motor having a field system and an electrically conductive member, one of the movable and stationary sections of said linear motion electric motor being formed by said field system, and the other section being formed by said electrically conductive member.

6. An injection molding machine according to claim 2, wherein said linear motion electric motor includes a non-magnetic shaft, a plurality of annular yokes and annular permanent magnets alternately fitted on and in an axial direction of the shaft, a tubular structure through which the shaft is loosely inserted, said tubular structure having an outer tube made of a soft magnetic material, and a plurality of annular cores and annular printed coils alternately disposed in the outer tube in an axial direction of the tubular structure, one of the movable and stationary sections of said linear motion electric motor being formed by said shaft and the other section being formed by said tubular structure.

7. An injection molding machine according to claim 6, wherein the injection molding machine includes an injection mechanism having a screw, said screw being the linear motion member, and being coupled to said non-magnetic shaft of said linear motion electric motor.

8. An injection molding machine according to claim 1, wherein said linear motion electric motor is an induction electric motor having a field system and an electrically conductive member, one of the movable and stationary sections of said linear motion electric motor being formed by said field system, and the other section being formed by said electrically conductive member.

9. An injection molding machine according to claim 1, wherein said linear motion electric motor includes a non-magnetic shaft, a plurality of annular yokes and annular permanent magnets alternately fitted on and in an axial direction of the shaft, a tubular structure through which the shaft is loosely inserted, said tubular structure having an outer tube made of a soft magnetic material, and a plurality of annular cores and annular printed type coils alternately disposed in the outer tube in an axial direction of the tubular structure, one of the movable and stationary sections of said linear motion electric motor being formed by said shaft and the other section being formed by said tubular structure.

10. An injection molding machine according to claim 9, wherein the injection molding machine includes an injection mechanism having a screw, said screw being the linear motion member, and being coupled to said non-magnetic shaft of said linear motion electric motor.

11. An injection molding machine according to claim 1, further comprising a base, the linear motion member being linearly movable relative to the base.

12. An injection molding machine according to claim 1, wherein the linear motion member is a screw.

13. An injection molding machine having an injection mechanism including a screw which is disposed for rotation about an axis and for linear movement along said axis, said injection mechanism comprising:
   an electric motor for rotating the screw;
   means for operatively coupling the screw to said electric motor;
   a linear motion electric motor having a stationary section and a movable section which is linearly movable relative to said stationary section; and
   means for operatively coupling the screw to said movable section of said linear motion electric motor so as to be movable in unison with said movable section.

14. An injection molding machine according to claim 13, wherein said linear motion electric motor is a synchronous electric motor having a field system and an armature, one of the movable and stationary sections of said linear motion electric motor being formed by said field system, and the other secton being formed by said armature.

15. A drive unit for an injection molding machine having a stationary base portion, comprising:
   a linear motion member which is linearly movable relative to the stationary base portion of the injection molding machine; and
   a linear motion electric motor having a stationary section supported by the stationary base portion of the injection molding machine and a movable section which is linearly movable relative to the stationary section, said linear motion member being coupled to the movable section of said linear motion electric motor and being operable to axially drive the movable section.

16. A drive unit for an injection molding machine according to claim 15, wherein said linear motion electric motor is a synchronous electric motor having a field system and an armature, one of the movable and stationary sections of said linear motion electric motor being formed by said field system, and the other section being formed by said armature.

17. A drive unit for the injection molding machine according to claim 15, wherein said linear motion electric motor is an induction electric motor having a field system and an electrically conductive member, one of the movable and stationary sections of said linear motion type electric motor being formed by said field system, and the other section being formed by said electrically conductive member.

18. A drive unit for an injection molding machine according to claim 15, further comprising means operatively coupled to the movable section of the electric motor for rotating the movable section, wherein the linear motion member is a screw.

19. A drive unit for an injection molding machine according to claim 15, wherein said linear motion electric motor includes a non-magnetic shaft, a plurality of annular yokes and annular permanent magnets alternately fitted on and in an axial direction of the shaft, a tubular structure through which the shaft is loosely inserted, said tubular structure having an outer tube made of a soft magnetic material, and a plurality of annular cores and annular printed coils alternately disposed in the outer tube in an axial direction of the tubular structure, one of the movable and stationary sections of said linear motion electric motor being formed by said shaft and the other section being formed by said tubular structure.

20. A drive unit for an injection molding machine according to claim 19, wherein the injection molding machine includes an injection mechanism having a screw, said screw being the linear motion member, and being coupled to said non-magnetic shaft of said linear motion electric motor.

* * * * *